July 15, 1930. G. T. COOKE Re. 17,729

COTTER PIN LOCKING MEANS

Original Filed April 12, 1928

INVENTOR
George T. Cooke,
BY
Mitchell & Beckert
ATTORNEYS.

Reissued July 15, 1930 Re. 17,729

UNITED STATES PATENT OFFICE

GEORGE T. COOKE, OF SOUTH NORWALK, CONNECTICUT

COTTER-PIN-LOCKING MEANS

Original No. 1,692,026, dated November 20, 1928, Serial No. 269,380, filed April 12, 1928. Application for reissue filed May 16, 1930. Serial No. 453,071.

This invention relates to certain new and useful improvements in cotter pin locking devices in which the mere application of a cotter pin to the device to be locked automatically spreads the two ends of the cotter pin instead of requiring a separate manual act.

The main object of the invention is to provide means to prevent a cotter pin from being improperly applied to the device to be locked, as will later appear.

In the drawings—

Figure 1:
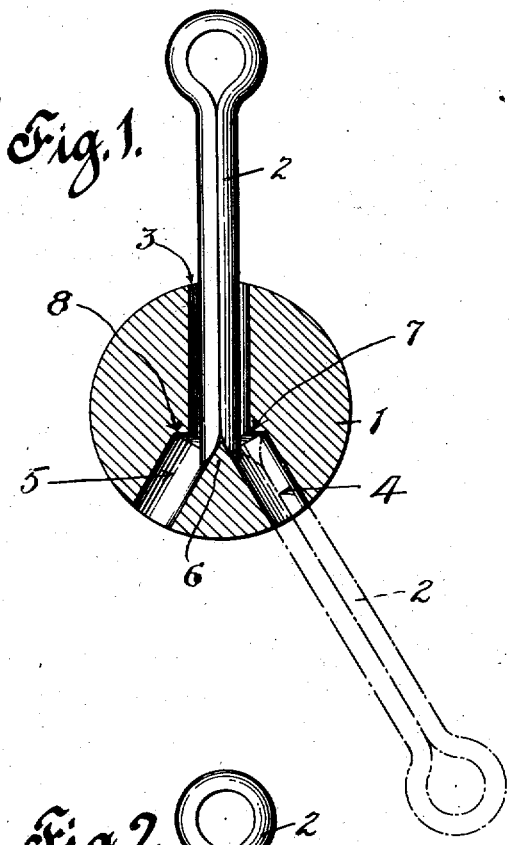
Fig. 1 is a cross section of the body of a pin designed to receive a cotter pin, the latter being shown partly in place and in elevation.
Figure 2:
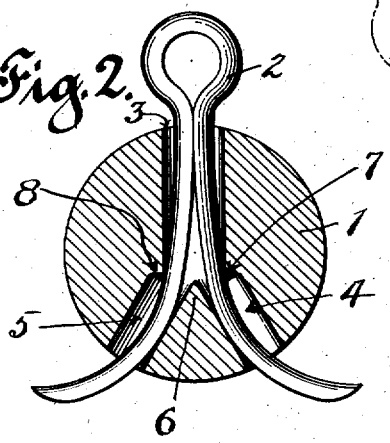
Fig. 2 is a similar view showing the cotter pin fully in place.

1 is the body of what I will term a pin, which may be the body of a plain surfaced pin or an ordinary bolt. 2 represents a cotter pin. 3 represents a cotter pin entrance bore which proceeds part way through the body of the pin 1. 4—5 represent divergent outlet or exit bores which communicate with the inner end of the entrance bore 3, and which form between them a wedge 6 in line with the entrance bore 3 so that when the cotter pin 2 is introduced into the entrance bore 3, as shown in Fig. 1, and pushed fully into place, said wedge will cause the ends of the cotter pin 2 to spread apart, as shown in Fig. 2, whereby the cotter pin will be secured against accidental or unintentional disengagement.

Inasmuch as the cotter pin will not be properly acted upon unless entered through the entrance bore 3, I provide means to stop or otherwise arrest an attempt to pass a cotter pin through one of the divergent outlet or exit bores 4—5 when introduced from the outer end of the latter. In the preferred form I provide at any convenient point, preferably at the inner end of each of these exit bores, an abrupt stop shoulder, said stop shoulders being shown respectively at 7—8. In the drawing in Fig. 1, I have indicated in dotted lines what would happen if the cotter pin 2 were introduced into the exit bore 4. It is apparent at once that the inner end of the pin would be stopped by the shoulder 7, and thus the improper application of the cotter pin would be prevented.

What I claim is:

1. In a cotter pin locking device, a body designed to receive a cotter pin, said body having a cotter pin entrance bore proceeding part way through the same, two divergent exit bores for the two ends of a cotter pin, said exit bores communicating with the entrance bore, a cotter pin spreading wedge between said exit bores and facing the entrance bore, with a stop shoulder within each exit bore to prevent a cotter pin from being entered into the entrance bore through one of the exit bores.

2. In a cotter pin locking device, a body designed to receive a cotter pin, said body having a cotter pin entrance bore proceeding part way through the same, two exit bores leading divergently from the entrance bore for the two ends of a cotter pin, a cotter pin spreading wedge between said exit bores and facing the entrance bore, with means within the exit bores to stop a cotter pin entered through the outer end of an exit bore before it reaches the entrance bore.

3. A cotter pin locking device comprising a body, a cotter pin entrance passage therein extending only part way therethrough, two divergent exit passages communicating with the inner end of said entrance passage, a wedge between said exit passages in line with said entrance passage, stop shoulders in line with the exit passages and at opposite sides of the inner end of said entrance passage to stop a cotter pin entered through the outer end of an exit passage.

GEORGE T. COOKE.